Aug. 27, 1963  K. RAAB ETAL  3,101,680
DOUBLE-DECKER AUTOMOBILE TRANSPORTER RAILROAD CAR END UNIT
Filed Feb. 13, 1961  2 Sheets-Sheet 2

INVENTORS
KARL RAAB
FRIEDRICH BURCHARD
BY
Stevens, Davis, Miller + Mosher
ATTORNEYS

United States Patent Office 3,101,680
Patented Aug. 27, 1963

3,101,680
DOUBLE-DECKER AUTOMOBILE TRANSPORTER
RAILROAD CAR END UNIT
Karl Raab, Minden, and Friedrich Burchard, Elze,
Hannover, Germany, assignors to Niedersachsische
Waggonfabrik Joseph Graaff G.m.b.H., Elze, Hannover, Germany
Filed Feb. 13, 1961, Ser. No. 88,940
6 Claims. (Cl. 105—368)

The present invention relates to double-decker automobile transporter railroad car end units, and has the principal object of providing headroom therein for road vehicles higher than the usual automobiles, for example for small buses, without exceeding the prescribed railroad loading gauge or profile and without reducing the diameter of the wheels of said car units.

With this and other objects in view which will become apparent later from this specification and the accompanying drawings, we provide a double-decker automobile transporter railroad car end unit comprising in combination: a chassis or frame structure, sprung axles journalled on said chassis, wheels mounted on said axles, upper and lower decks with tracks thereon, for the road vehicles to be transported, the lower deck tracks being arranged on said chassis on a general level below the top of the said wheels, the lower deck tracks having track extension links hinged to said chassis fore and aft of each wheel and overlapping one another above said wheels, and springs interposed between said chassis and the said links biasing the latter upward into a humped position clearing the top of said wheels, said springs yielding under the weight of a road vehicle passing over said links, allowing the latter to collapse to a position substantially level with said lower tracks.

Figure 1:
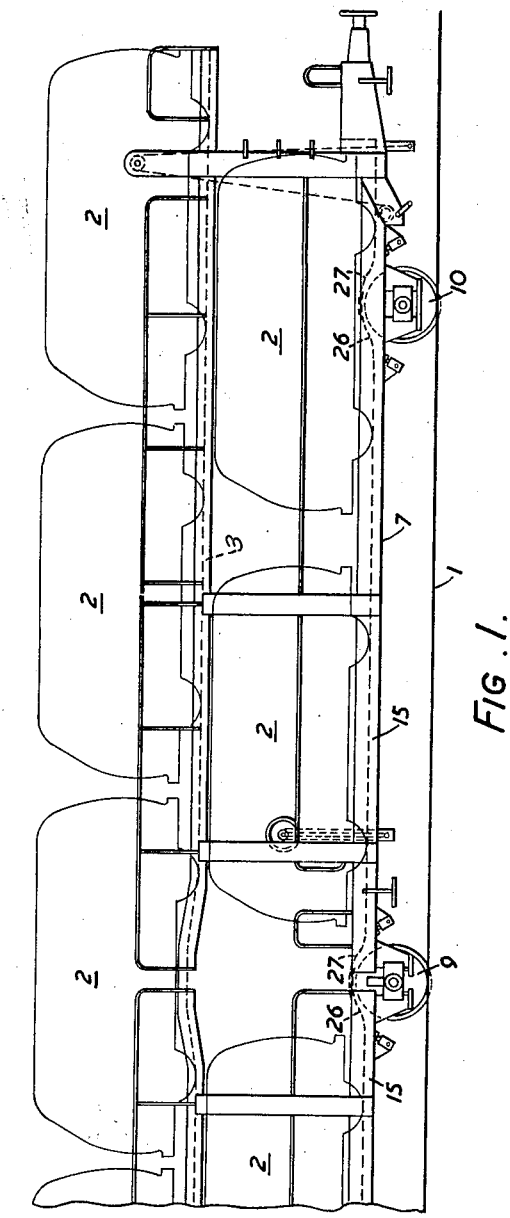
Figure 2:
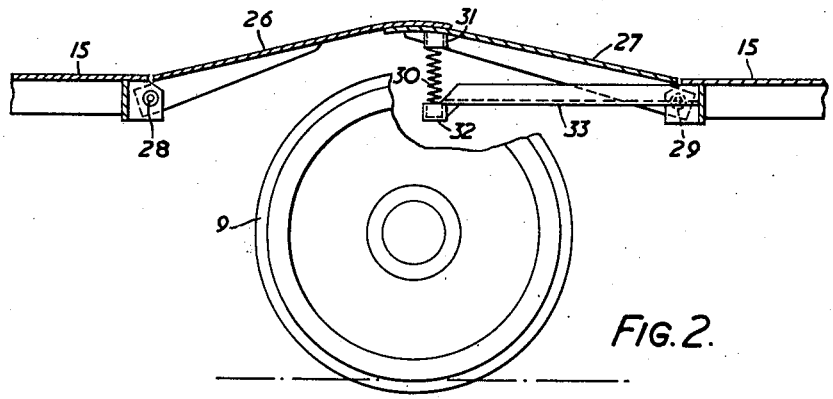
Figure 3:
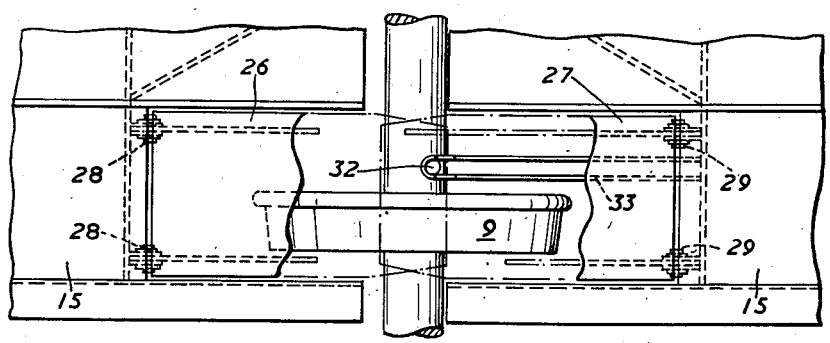
Figure 4:
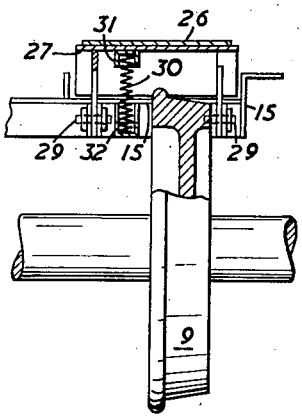
Figure 5:
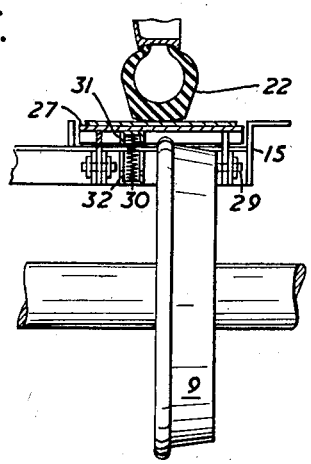

These and other features of our said invention will be clearly understood from the following description of a preferred form thereof given by way of example with reference to the accompanying drawings in which:

FIG. 1 is a diagrammatic sectional side elevation of part of a double-decker automobile transporter railroad car end unit according to the invention, FIG. 2 shows a detail of FIG. 1 in section, partly broken away, on a larger scale, FIG. 3 is a plan view to FIG. 2, FIG. 4 is a part-sectional end elevation to FIG. 2 both FIGS. 2 and 4 being in the normal working position, FIG. 5 is an end elevation like FIG. 3, but in the depressed position under the weight of an automobile passing over it.

Referring firstly to FIG. 1, a double-decker automobile transporter car unit has a chassis or frame 7 resiliently supported on flange wheels 9, 10 of conventional diameter, say 750 mm., of single axle trucks running on rails 1. As is clearly apparent in FIG. 1 the wheels 9 also form a common support for an adjacent car unit. Light motor buses 2 of a height exceeding that of an ordinary automobile are shown on the two decks appropriately spaced and super-imposed one above the other. Those on the upper deck are supported on a pair of flat straight tracks 3 for the tires as usual. However, as clearly shown in FIG. 1 the tracks 3 have a slight rise or hump at the end of the car unit facing the adjacent car unit also supported by wheels 9. The pair of automobile tracks 15 for the lower deck are in alignment with the flanged wheels 9, 10 and are kept at a general level appreciably below the uppermost edge or contour of the wheels 9, 10 of the truck except for resiliently collapsible track bridging link portions 26, 27 forming humps (FIG. 2) just above these wheels which will now be described in more detail with reference to FIGS. 2-5.

The said humps of each lower deck track 15 (FIG. 2) are formed by two longitudinal extending links 26, 27 contactingly overlapping at their adjacent ends and hinged at their remote ends to opposite sides of an opening in each track on the chassis at 28, 29, respectively directly over truck wheels 10 located near the free end of the car unit. With respect to truck wheels 9 only the track links 27 are hinged to the end of chassis 7 of the end car unit, as indicated in FIG. 1, since the associated links 26 are carried on the end of the adjacent car unit. The overlapped engaged ends of links 26, 27 are slightly and correspondingly curved, as shown in FIG. 2, to provide for smooth continuity of their upper track surfaces when in their uppermost position, as illustrated. A compression spring 30, interposed between an abutment 32 at the end of a supporting cantilevered arm 33 fixed to the chassis and an aligned abutment 31 on the underside of the link 27 biases the track links 26, 27 upward to the humped position shown on FIGS. 2 and 4 unless an automobile or light bus rests with its wheel 22 on the top of the links 26, 29 and by its weight depresses them into the collapsed position shown in FIG. 5 in which they rest on the rims of the wheels 9 of the car unit. This condition is however only a temporary one while the automobiles or light buses 2 are marshalled into position in the transporter, i.e. while the car unit is stationary. When the automobiles or light buses 2 are safely secured in position, the track links 26, 27 lie between the axles of the automobiles or light buses 2 (FIG. 1) and by the bias of their springs 30 return to the humped position (FIGS. 2, 4) where they are clear of the wheels 9 of the car unit.

It will be realized that the percent invention allows the loading of road vehicles such as light buses of a height exceeding that of an ordinary automobile into a transporter railroad car unit keeping within the prescribed loading gauge or profile without reducing the diameter of the wheels of said car unit.

While we have herein described and in the accompanying drawings illustrated what may be considered a typical and particularly useful embodiment of our said invention we wish it to be understood that we do not limit ourselves to the particular details and dimensions described and illustrated; for obvious modifications will occur to a person skilled in the art.

What we claim as our invention and desire to secure by Letters Patent, is:

1. An automobile transporter railroad car unit comprising in combination: a car frame structure, single axle trucks resiliently supporting said car frame structure, said single axle trucks each including flanged rail-engaging wheels supporting said car frame structure, a plurality of fixed decks mounted in super-imposed, spaced, parallel relation on said car frame structure, fixed track means mounted on each of said decks and extending the full length longitudinally thereof, said track means rollably receiving and supporting automobiles thereon, the lower deck and track means thereon being disposed at a level appreciably below the tops of said flanged rail-engaging wheels, openings in said lower deck track means disposed over the wheels of one of said trucks providing clearance for projection of a portion of said flanged wheels therethrough, a pair of track extension links pivotally mounted at opposite sides of each of said openings and at their free ends overlappingly engaging directly above each of said flanged truck wheels, resilient means normally biasing said overlapped track extension links upward and clear of each of said flanged wheels and into a humped position, said resilient means yielding under the weight of an automobile passing over said hinged track extension links whereby each pair of said overlapped engaged ends thereof are depressed into engagement with and supported by the rim of each of the flanged truck wheels.

2. The structure as defined in claim 1, wherein the tracks on each of said plurality of decks each comprise flat upper surfaces adapted for rollably receiving and supporting the wheels of automobiles thereon; said overlapped engaged ends of said track extension links being slightly correspondingly curved for smooth track continuity of their upper surfaces when said links are biased into their uppermost position.

3. The structure as defined in claim 2 wherein the said fixed tracks on said decks are in alignment with said track extension links and said flanged rail-engaging wheels.

4. An automobile transporter railway car end unit comprising in combination: a car frame structure, spaced single axle trucks each including flanged rail-engaging wheels supporting said car frame structure, a pair of vertically spaced, substantially parallel decks extending the full longitudinal length of said car end unit, said lower deck being positioned at a level appreciably below the upper limits of said flanged rail-engaging wheels, laterally spaced track means fixedly mounted directly on at least the lower deck for rollably receiving and supporting automobiles thereon, said track means extending throughout the entire longitudinal extent of said lower deck, each of said spaced lower track means intermediate its length having an opening therein directly above each of said flanged rail-engaging wheels of one of said single axle trucks providing clearance for projection of a portion of one of said flanged rail-engaging wheels therethrough, a pair of track extension links pivotally mounted at opposite sides of each of said openings and at their free ends overlappingly engaging directly above each of said flanged rail-engaging wheels, spring means normally biasing said overlapped track extension links upward and clear of said flanged rail-engaging wheels and into a humped position, said overlapped engaged link ends being slightly correspondingly curved for smooth track continuity when biased upwardly by said spring means, said spring means yielding under the weight of an automobile passing over said hinged track extension links whereby said overlapped engaged link ends are depressed into engagement with and rigidly supported by the rims of said flanged rail engaging wheels.

5. The structure as defined in claim 4 wherein a fixed support means extends from said car frame structure to a point underlying the overlapped engaging ends of said track links, vertically aligned spring holding abutment means on the end of said support means and one of said overlapped link ends, said spring means being mounted in said vertically aligned spring holding abutment means.

6. A railway freight car supported on flanged wheels and having a deck the level of which is disposed appreciably below the upper limits of said flanged wheels, tracks extending longitudinally on said deck the full length of said car disposed in longitudinal alignment with said flanged wheels, at least one opening in each of said tracks disposed directly over one of said flanged wheels providing rolling clearance therefor, a pair of track extension links pivotally mounted at the track ends of said opening with the free ends of said track extensions overlappingly and slidably engaging each other directly above said flanged wheel, resilient means normally biasing said overlapped track extensions upward and clear of said flanged wheel and into a humped position, said resilient means yielding under the weight of freight moved across said extensions whereby said overlapped portions of said track extensions are depressed into supporting engagement with the flange of said flanged wheel, said track extensions being returned to their initial upper position by said resilient means when the freight is removed therefrom.

References Cited in the file of this patent
UNITED STATES PATENTS

| | | |
|---|---|---|
| 1,280,142 | Bonner | Oct. 1, 1918 |
| 1,809,557 | Lishon | June 9, 1931 |
| 1,986,120 | Sanford | Jan. 1, 1935 |
| 2,146,203 | Demarest | Feb. 7, 1939 |
| 2,585,126 | Holland | Feb. 12, 1952 |
| 2,920,917 | Sheehan | Jan. 12, 1960 |